United States Patent
Fletcher et al.

(10) Patent No.: US 9,133,852 B2
(45) Date of Patent: Sep. 15, 2015

(54) PNEUMATIC COMPRESSOR RECIRCULATION VALVE SYSTEM FOR MINIMIZING SURGE UNDER BOOST DURING THROTTLE CLOSING

(71) Applicants: Dave Fletcher, Flint, MI (US); Brian M. Graichen, Leonard, MI (US); Keith Hampton, Ann Arbor, MI (US); Matt Gilmer, Whitmore Lake, MI (US); James H. Miller, Ortonville, MI (US); Steve Long, Berkley, MI (US)

(72) Inventors: Dave Fletcher, Flint, MI (US); Brian M. Graichen, Leonard, MI (US); Keith Hampton, Ann Arbor, MI (US); Matt Gilmer, Whitmore Lake, MI (US); James H. Miller, Ortonville, MI (US); Steve Long, Berkley, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 0 days.

(21) Appl. No.: 14/304,219

(22) Filed: Jun. 13, 2014

(65) Prior Publication Data
US 2014/0369806 A1    Dec. 18, 2014

Related U.S. Application Data

(60) Provisional application No. 61/834,750, filed on Jun. 13, 2013.

(51) Int. Cl.
*F02B 33/44* (2006.01)
*F04D 27/00* (2006.01)
*F02D 41/00* (2006.01)
*F02B 37/16* (2006.01)

(52) U.S. Cl.
CPC ............. *F04D 27/003* (2013.01); *F02B 37/16* (2013.01); *F02D 41/0007* (2013.01); *Y02T 10/144* (2013.01)

(58) Field of Classification Search
CPC .... F02D 41/0007; F02B 43/00; Y02T 10/144
USPC .................................................. 60/598, 605.1
See application file for complete search history.

(56) References Cited

U.S. PATENT DOCUMENTS

| | | | |
|---|---|---|---|
| 4,336,688 A | 6/1982 | Dellis | |
| 5,005,550 A * | 4/1991 | Bugin et al. | 123/520 |
| 5,979,418 A * | 11/1999 | Saruwatari et al. | 123/519 |
| 6,813,887 B2 | 11/2004 | Sumser et al. | |

(Continued)

OTHER PUBLICATIONS

PCT, International Search Report and Written Opinion, PCT/US2014/042309 (Oct. 29, 2014).

(Continued)

*Primary Examiner* — Audrey K Bradley
(74) *Attorney, Agent, or Firm* — Thompson Hine LLP

(57) ABSTRACT

An engine system having a compressor coupled to an engine and supplying air to an intake manifold, a throttle controlling the supply of air from the compressor to the intake manifold, a compressor recirculation valve (CRV) having a pneumatic control chamber, and a throttle aspirator having its motive section in fluid communication with an inlet of the throttle and its discharge section in fluid communication with an outlet of the throttle and its suction port in fluid communication with the pneumatic control chamber of the CRV. Such an engine system automatically minimizes surge during boost without a control system activating the CRV. Here, the CRV operates purely on the changes in pressure within the system forming a loop that resets itself. In another embodiment, a gate valve and a vacuum canister may be included rather than having the throttle aspirator directly connected to the CRV's pneumatic control chamber.

16 Claims, 3 Drawing Sheets

(56) References Cited

U.S. PATENT DOCUMENTS

| | | |
|---|---|---|
| 6,945,236 B2 | 9/2005 | Nakai et al. |
| 7,529,614 B1 | 5/2009 | Müller |
| 7,614,384 B2 | 11/2009 | Livshiz et al. |
| 8,434,305 B2 | 5/2013 | Donkin et al. |
| 8,683,800 B2 | 4/2014 | Cunningham et al. |
| 2004/0159291 A1 | 8/2004 | Schmied |
| 2007/0295303 A1 | 12/2007 | Hirooka et al. |
| 2008/0022679 A1 | 1/2008 | Hara et al. |
| 2011/0132311 A1 | 6/2011 | Pursifull et al. |
| 2011/0252785 A1 | 10/2011 | Pursifull et al. |
| 2012/0024267 A1 | 2/2012 | Pursifull et al. |
| 2012/0198837 A1* | 8/2012 | Medina .......................... 60/602 |
| 2012/0237367 A1 | 9/2012 | Cunningham et al. |
| 2013/0233276 A1 | 9/2013 | Pursifull et al. |
| 2013/0340428 A1* | 12/2013 | Graichen et al. ............. 60/605.2 |
| 2013/0340732 A1 | 12/2013 | Pursifull et al. |
| 2014/0014080 A1 | 1/2014 | Beshay et al. |
| 2014/0123941 A1 | 5/2014 | Ulrey et al. |

OTHER PUBLICATIONS

PCT, International Search Report and Written Opinion, PCT/US2014/042307 (Oct. 22, 2014).

\* cited by examiner

PNEUMATIC COMPRESSOR RECIRCULATION VALVE SYSTEM FOR MINIMIZING SURGE UNDER BOOST DURING THROTTLE CLOSING

RELATED APPLICATIONS

This application claims the benefit of U.S. Provisional Application No. 61/834,750, filed Jun. 13, 2013, which is incorporated herein by reference in its entirety.

TECHNICAL FIELD

This application relates to compressor recirculation valves ("CRV"), more particularly to such valves in a system to control the recirculation of turbocharger compressor outlet air around the compressor and back to the compressor inlet in order to minimize surge.

BACKGROUND

The advent of affordable natural gas has been embraced by the makers of over the road vehicle engines and they are now adapting their formerly diesel fueled engines to operate with natural gas. This requires some changes, including the addition of a throttle in the intake air stream. When the throttle is closed quickly a condition call surge can be initiated. When a turbocharger is in a state of surge it no longer can effectively compress the intake charge, however it is still absorbing power from the exhaust gas flow. In a throttle closing transient this loss of compression causes the turbocharger to speed up, while simultaneously the flow rate of air into the engine is decreased. In a fraction of a second the exhaust power available to the turbocharger decreases dramatically, slowing the turbocharger back down and in turn increasing the compression pressure.

This unstable operation can occur for several oscillations, causing the vehicle to vibrate and the torque output by the engine to vary. Thus, there is a need for improved designs to control the turbocharger operation during the transient throttle closing period in a natural gas powered engine.

SUMMARY

In one aspect, an engine system is disclosed that minimizes surge during boost without an external control system monitoring and activating a CRV, as shown in FIG. 4, and/or a CRV and a gate valve, as shown in FIG. 1. In the disclosed engine systems the CRV and/or the gate valve operate purely on the changes in pressure within the system, thereby forming a loop that resets itself.

In one aspect, an engine system having a throttle aspirator directly connected to the pneumatic control chamber of a CRV is disclosed. Such an engine system includes a compressor coupled to an engine and supplying air to an intake manifold, a throttle controlling the supply of air from the compressor to the intake manifold, a compressor recirculation valve (CRV) having a pneumatic control chamber, and a throttle aspirator having its motive section in fluid communication with an inlet of the throttle and its discharge section in fluid communication with an outlet of the throttle and its suction port in fluid communication with the pneumatic control chamber of the CRV. The engine may be a natural gas engine.

In operation, under boost with the throttle closed, increased flow occurs through the throttle aspirator thereby generating greater suction vacuum than during the steady state with no boost which evacuates the pneumatic control chamber of the compressor recirculation valve thereby opening the compressor recirculation valve to allow compressed air to flow through the bypass. Then, when the throttle opens to a predetermined partially open position and the flow through the throttle aspirator decreases to a threshold value, the compressor recirculation valve closes under the force of a spring therein. In a steady state with boost, air flows through the throttle creating a pressure drop and little suction vacuum is created which enables the CRV to maintain the valve portion thereof in the closed position.

In another aspect, engine systems are disclosed that may include a compressor coupled to an engine and supplying air to an intake manifold, a throttle controlling the supply of air from the compressor to the intake manifold, a vacuum reservoir, a first aspirator having its motive section in fluid communication downstream of the compressor and its discharge section in fluid communication upstream of the compressor and a suction port in fluid communication with the vacuum reservoir, a compressor recirculation valve having a pneumatic control chamber, a gate valve controlling the fluid communication of the pneumatic control chamber of the compressor recirculation valve with the downstream air and the vacuum reservoir, and a second aspirator having its motive section in fluid communication with an inlet of the throttle and its discharge section in fluid communication with an outlet of the throttle. The suction port of the second aspirator is in fluid communication with the pneumatic control chamber of the gate valve.

Under boost with the throttle open, the first aspirator evacuates the vacuum reservoir, the flow through the second aspirator is at a minimum thereby allowing compressed air from the compressor to flow through the suction port into the pneumatic control chamber of the gate valve which moves or maintains the gate valve in a first open position placing the pneumatic control chamber of the compressor recirculation bypass valve in fluid communication with compressed air from the compressor thereby closing the compressor recirculation valve or maintaining the closed position of the compressor recirculation valve. Then, when the throttle closes under boost, the second aspirator evacuates the pneumatic control chamber of the gate valve, which switches the gate valve from the first open position to a second open position placing the pneumatic control chamber of the compressor recirculation bypass valve in fluid communication with the vacuum reservoir thereby opening the compressor recirculation valve in response to a vacuum reservoir pressure.

DETAILED DESCRIPTION

Figure 1:
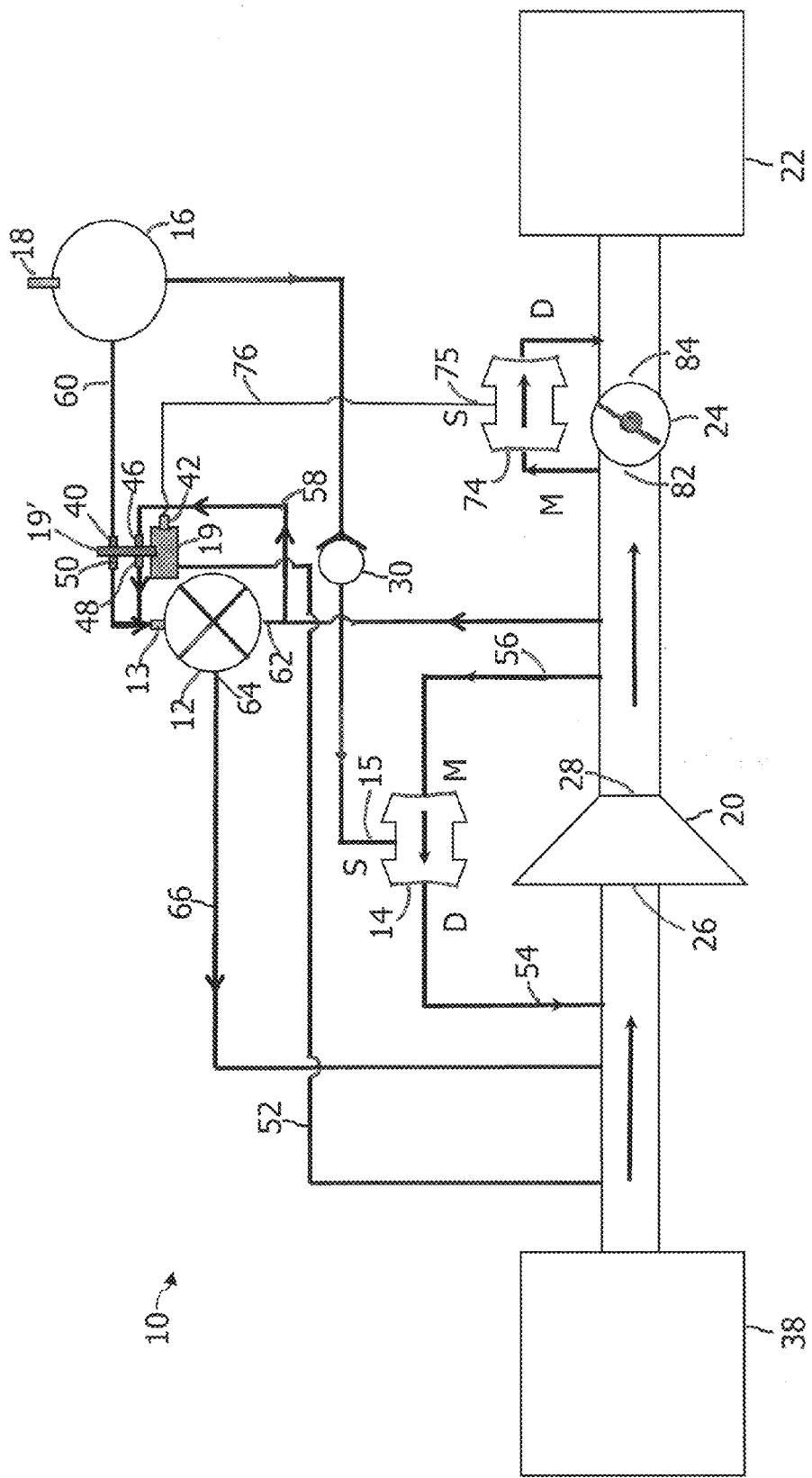
FIG. 1 is a schematic illustration of a system configuration that includes a pressure boost sensing compressor recirculation valve (CRV).

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

FIG. 1 illustrates at least a portion of an engine system, generally designated as reference number 10, for example, a natural gas engine system, having a CRV 12 controlled by a unique assembly of components within an engine system. The engine system 10 includes a compressor 20 in fluid communication with an engine manifold 22 and having a throttle control 24 disposed in the fluid stream between the manifold 22 and the compressor 20. In embodiments where the boosting device is a turbocharger, compressor 20 may be coupled to, and driven by a turbine (not shown) in the engine exhaust of the engine system 10. The assembly operating the CRV 12 includes a first aspirator 14, a vacuum reservoir 16, a vacuum limiting valve 18, a gate valve 19 controlling fluid communication between the compressor 20 and the CRV 12 and between the vacuum reservoir 16 and the CRV 12, and a second aspirator 74. The system 10 includes a conduit 76 connecting a control chamber within the gate valve 19 to the fluid stream proximate the suction port 75 of the second aspirator 74. Optionally, the system 10 may also include a fluid line 52 in fluid communication with the actuator portion of the gate valve 19. The system 10 may also include one or more valves such as, but not limited to, check valve 30. Conduit is not to be construed to mean any specific type of material or connection and should be understood to include tubing, hoses, pipes, and the like whether rigid or flexible.

The CRV may be, but is not limited to, the configurations disclosed in commonly assigned U.S. patent application Ser. No. 13/921,473, filed Jun. 19, 2013, herein incorporated by reference in its entirety, but likely not requiring the position sensing or solenoid and simply being operable to be either open or closed. In one embodiment, the CRV 12 may have a pneumatic control chamber and a spring (not shown) in a configuration similar to that in FIGS. 2 and 3, but may include a gate valve, a poppet valve, a butterfly valve, or other known valve constructions to open and close the bypass 66. In FIG. 1, the CRV 12 includes an inlet port 62 and an outlet port 64 in fluid communication with one another when the valve portion of the CRV 12 is in an open position, which allows compressed air to flow through the bypass 66 back to the upstream side of the compressor 20. The movement of the valve portion of the CRV 12 is controlled by the spring and pressures introduced or removed from the pneumatic control chamber. The control port 13 of the pneumatic control chamber is in fluid communication with downstream air from the compressor and in fluid communication with the vacuum reservoir 16. However, these two are controlled by the gate valve 19.

Figures 2, 3:
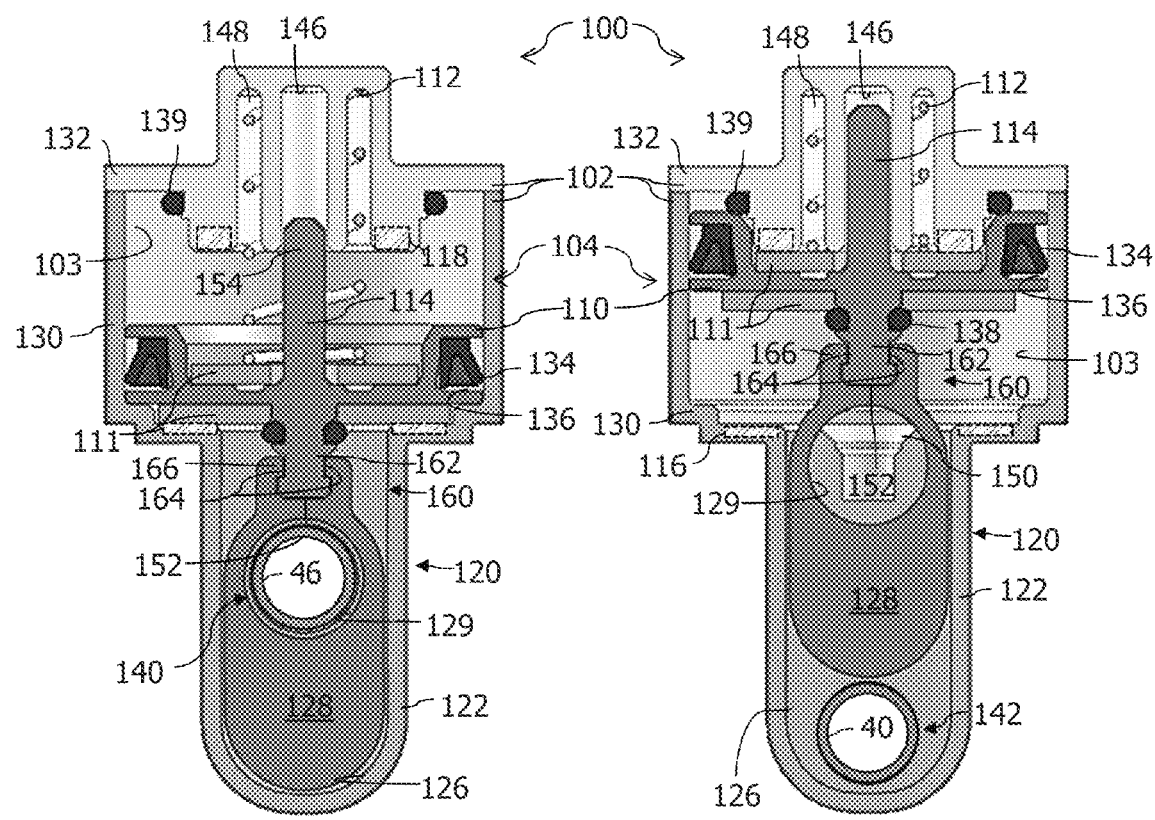
FIG. 2 is a cross-sectional view of a snap actuator gate valve taken transverse to the longitudinal axis of the conduit through the gate member, with the valve in a first open position aligned with a first conduit.
FIG. 3 is a cross-sectional view of the snap actuator gate valve of FIG. 2 with the valve in a second open position aligned with a second conduit.

The gate valve 19 includes a pneumatic control chamber 103 (see FIGS. 2 and 3) having a control port 42 (FIG. 1) connected to the suction port 75 of the second aspirator 74 by conduit 76 for fluid commination therebetween. The second aspirator 74 is connected into the system such that the motive port (M) thereof is in fluid communication with the fluid stream upstream of an inlet to the throttle control 24 and the discharge port (D) is in fluid communication with the fluid stream downstream of the outlet to the throttle control 24 leading to the manifold 22. Conduit 76 may be referred to as a throttle position "sensing" line because the vacuum generated by the second aspirator 74 changes in response to the pressure drop as fluid flows through the throttle 24 and in particular when the throttle closes and fluid is diverted through the second aspirator 74 instead. The pressure drop and throttle closing are "sensed" by the second aspirator and automatically act upon the gate valve 19 so that it switches from a first open position 140 (FIG. 2) to a second open position 142 (FIG. 3). When the flow of air through the second aspirator is sufficient, a vacuum pressure draws fluid in through the suction port. Here, the vacuum pressure generated depends on the throttle's pressure drop.

Referring again to FIG. 1, the gate portion 19' of the gate valve 19 includes a first inlet port 46 extending therefrom and a first outlet port 48 extending therefrom in opposite directions and aligned for fluid communication with one another. The fluid communication therebetween is controlled by the gate valve 19. The gate valve 19 includes a gate mechanism movable to allow fluid to flow from the first inlet port 46 to the second outlet port 48. This may include aligning a passageway 129 in FIG. 2 in the gate mechanism with the first inlet port 46 or moving the gate mechanism such that it does not block or obstruct the first inlet port 46. The gate portion 19' also includes a second inlet port 40 extending therefrom and a second outlet port 50 extending therefrom in opposite directions and aligned for fluid communication with one another. The fluid communication therebetween is controlled by the gate valve 19 in a similar manner to that just described for the first inlet port 46.

Gate valve 19 also includes a closing mechanism or actuator 104 (see FIGS. 2 and 3) to control the flow of fluid from the first inlet port 46 to the first outlet port 48 and from the second inlet port 40 to the second outlet port 50. In FIG. 1, the first outlet port 48 is in fluid communication with the control port 13 of the pneumatic control chamber of the CRV 12. Thus, when the valve mechanism 120 is in the first open position 140 depicted in FIG. 2, compressed air is in fluid communication with the pneumatic control chamber of the CRV 12. As depicted in FIG. 1, the second outlet port 50 is also in fluid communication with the control port 13 of the pneumatic control chamber of the CRV 12. Thus, when the valve mechanism 120 is in the second open position 142 depicted in FIG. 3, the vacuum canister 16 is in fluid communication with the control port 13 of the pneumatic control chamber of the CRV 12 and can reduce the pressure in the pneumatic control chamber. Accordingly, both the first outlet port 48 and the second outlet port 50 are connected to control port 13 and hence the pneumatic control chamber of the CRV 12 for fluid communication therewith to affect the opening and closing of the valve portion thereof.

The first aspirator 14 is one that generates vacuum pressure and is connected in fluid communication between a first end 26 and a second end 28 of the compressor 20 in such a way that when the compressor 20 is generating boost the first aspirator 14 is generating vacuum. As seen in FIG. 1, the first aspirator 14 is connected in fluid communication downstream of the second end 28 of the compressor 20 such that the compressed air exiting the compressor provides the motive flow M into the first aspirator 14 via conduit 56 and the discharge flow D is discharged upstream of the first end 26 of the compressor 20 via conduit 54. The first aspirator 14 may be, but is not limited to, the configurations disclosed in commonly assigned U.S. patent application Ser. No. 14/294,727, filed Jun. 3, 2014, herein incorporated by reference in its entirety. The suction port 15 of the first aspirator 14 is in fluid communication with the vacuum reservoir 16 and may include a first check valve 30 in the fluid stream therebetween to control the evacuation of the vacuum reservoir 16 as a result of the motive flow through the first aspirator 14. The vacuum reservoir 16 includes a vacuum limiting valve 18 to limit the amount of reservoir vacuum pressure generated and is connected to the gate valve 19, in particular to its second inlet port 40 by a conduit 60.

Referring now to FIGS. 2 and 3, the gate valve 19, in one embodiment, may be a snap actuator gate valve 100. The snap actuator gate valve 100 includes a container portion 130 and a cap 132 sealingly connected to the container portion 130 and defining an internal chamber 103 and having a control port 42 (FIG. 1) in fluid communication with the chamber 103. Housed within the chamber 103 is an actuator 104 that includes a piston 110 having a stem 114 connectable to a valve mechanism 120. The stem 114 has a proximal end 152 (which may be referred to herein as the coupling end) proximate to the valve mechanism 120 and a distal end 154 removed from the valve mechanism 120 (labeled in FIG. 2). The valve mechanism 120, in this embodiment, includes a pocket 126 enclosing the gate member 128, which has a passage 129 therethrough. The pocket 126 is connected to a first conduit 58 by the first inlet port 46 and to a second conduit 60 by the second inlet port 40 and opposite the first conduit 58 is connected to the control port 13 of the CRV 12 and opposite the second conduit 60 is connected to the bleed line 52 and the control port 13 of the CRV 12.

Still referring to FIGS. 2-3, the gate member 128 is connected to the piston 110 by a rail system 160 providing sliding movement of the gate member 128 in the direction of and in response to fluid flow thereby forming a seal against the pocket 126. The rail system 160 includes a guide rail 162 near the proximal end 152 of stem 114. The guide rail 162 includes raceway grooves 164 on opposing sides thereof. The gate member 128 includes a slider 166 shaped and configured to fit over the guide rail 162 and conform to the raceway grooves 164.

The actuator 104 controls the opening and closing of the valve mechanism 120, in particular the gate member 128 by the movement of the piston 110. As seen in FIGS. 2 and 3, the piston 110 is movable between a first open position 140 (FIG. 2) where the gate is aligned with the first conduit 58 and a second open position 142 (FIG. 3) where the gate closes the first conduit 58 and opens the second conduit 60. The valve mechanism 120 may start in either position or may be elongated, and the first and second conduits 58, 60 spaced apart further relative to one another, to also provide for a closed position for both the first and the second conduits 58, 60 at the same time.

The piston 110 at least partially includes a magnetically-attractable material 111 (or is made of such material) such that the piston 110 is attractable to a first magnet 116 and a second magnet 118. A spring 112 is seated against the piston 110 to bias the piston 110 generally into the first open position 140 (FIG. 2) and the first magnet 116 is positioned to assist the spring 112 in maintaining the piston 110 in the first open position 140. The second magnet 118 is positioned to maintain the piston 110 in the second open position 142 (FIG. 3), when the piston 110 moves thereto. The piston 110 may also include a sealing member 134 about its outer periphery as a lip seal against the interior surface of chamber 103. The outer periphery of the piston 110 may include an annular groove 136 in which to seat the sealing member 134. In one embodiment, the sealing member 134 may be an O-ring, a V-ring, or an X-ring. Alternately, the sealing member 134 may be any other annular seal made of sealing material for sealing engagement against another member.

The stem 114 of the piston may also extend therefrom opposite the valve mechanism, and, as seen in FIGS. 2-3, be received in a guide channel 146 within the cap 132. The cap 132 may also include a seat 148 for the spring 112. These features of the cap 132 provide alignment to the actuator and prevent twisting and/or buckling of the spring and piston.

The actuator 104 may include a first bumper 138 positioned to reduce noise between the piston 110 and the housing 102 when arriving in the starting position 140 and a second bumper 139 positioned to reduce noise between the piston 110 and the housing 102 when arriving in the secondary position 142. The first bumper 138 may also be positioned to seal the opening 150 between the housing 102 and the valve mechanism 120 (see FIGS. 2 and 4). In one embodiment, opening 150 may be defined by a generally frustoconical surface. The first and second bumpers 138, 139 may be seated in annular grooves within the housing 102 or on a component of the piston 110, such as the stem 114.

In operation, the actuator 104 moves the piston 110 by the introduction of fluid into or the removal of fluid from the chamber 103 via the control port 42 and by the assistance of the magnets 116, 118 and the spring 112. The piston 110 is seated in the first open position 140 (FIG. 2) and remains in this position held there by the spring force and the magnetic force of the first magnet 116 until a threshold force is applied to the piston 110 that overcomes the spring force and magnetic force of the first magnet. Once this threshold force is reached, the piston 110 will move the full length of its travel to its second open position 142 (FIG. 3) with the assistance of the magnetic force of the second magnet, which thereafter maintains the piston 110 in the secondary position 142. The movement of the piston 110 through its full length of travel is a quick, nearly instantaneous movement substantially without pause therebetween, i.e., there is no lag or floating of the piston between the starting position 140 and the secondary position 142, which may be described as a "snap" movement of the piston. This "snap," which without bumpers is an audible sound, is a result of the magnetic attraction of the second magnet 118 for the piston 110, which acts to quickly move the piston to the second open position 142. The second magnet 118 thereafter holds or maintains the piston 110 in the second open position 142 until a lower threshold force is reached, at which point the piston moves back to the first open position 140 by again moving the full length of its travel as a snap-type movement. The snap actuator gate valve 100 may also include other features disclosed in commonly assigned U.S. patent application Ser. No. 14/154,268, filed Jan. 1, 2014 and herein incorporated by reference in its entirety.

Fluid line 52 leads from the actuator portion of the gate valve 19 to the air induction system 38, as illustrated in FIG. 1, upstream from the compressor 20, in particular upstream from its first end 26.

In operation there are three states to consider: (1) steady state with boost state, (2) the throttle closing state, and (3) steady state with no boost state. When the engine is under boost the boost pressure causes two things to occur: (a) the gate valve 19 moves the valve portion thereof to a position where fluid communication is allowed between the first inlet port 46 and the first outlet port 48, thereby providing fluid communication between the second end 28 of the compressor 20 and the pneumatic control chamber of the CRV 12; and (b) the first aspirator 14 generates vacuum which evacuates the vacuum reservoir 16. Occurrence (a) enables compressor outlet pressure, exiting the compressor 20, to act on the actuator inside the CRV 12 and thereby move the actuator to a closed valve position where it remains until this pressure is removed or overcome.

In the throttle closing state (i.e., when the throttle 24 is closed), a pressure drop is experienced across the throttle and more fluid is available to flow through the second aspirator 74, which generates vacuum. The vacuum generated acts on the gate valve 19 because of the fluid communication provided between the second aspirator 74 and the pneumatic control chamber of the gate valve by the throttle position "sensing" line 78. The vacuum causes the gate valve 19 to move, switching its fluid communication from the first outlet port 48 to the second outlet port 50. The second outlet port 50, as mentioned above, is connected to the vacuum reservoir 16 for fluid communication therebetween. This evacuates the pressure from the pneumatic control chamber of the CRV 12, which in turn opens the valve portion of the CRV to short circuit the compressor flow from its second end 28 (outlet) back to its first end 26 (inlet) through bypass 66.

Once the steady state with no boost is reached, the pressure difference between an inlet 82 and an outlet 88 of the throttle 24 remains, and so the aspirator 74 continues to generate a level of vacuum sufficient to maintain gate valve 19 in the second open position 142. In this way, CRV 12 remains closed.

Figure 4:
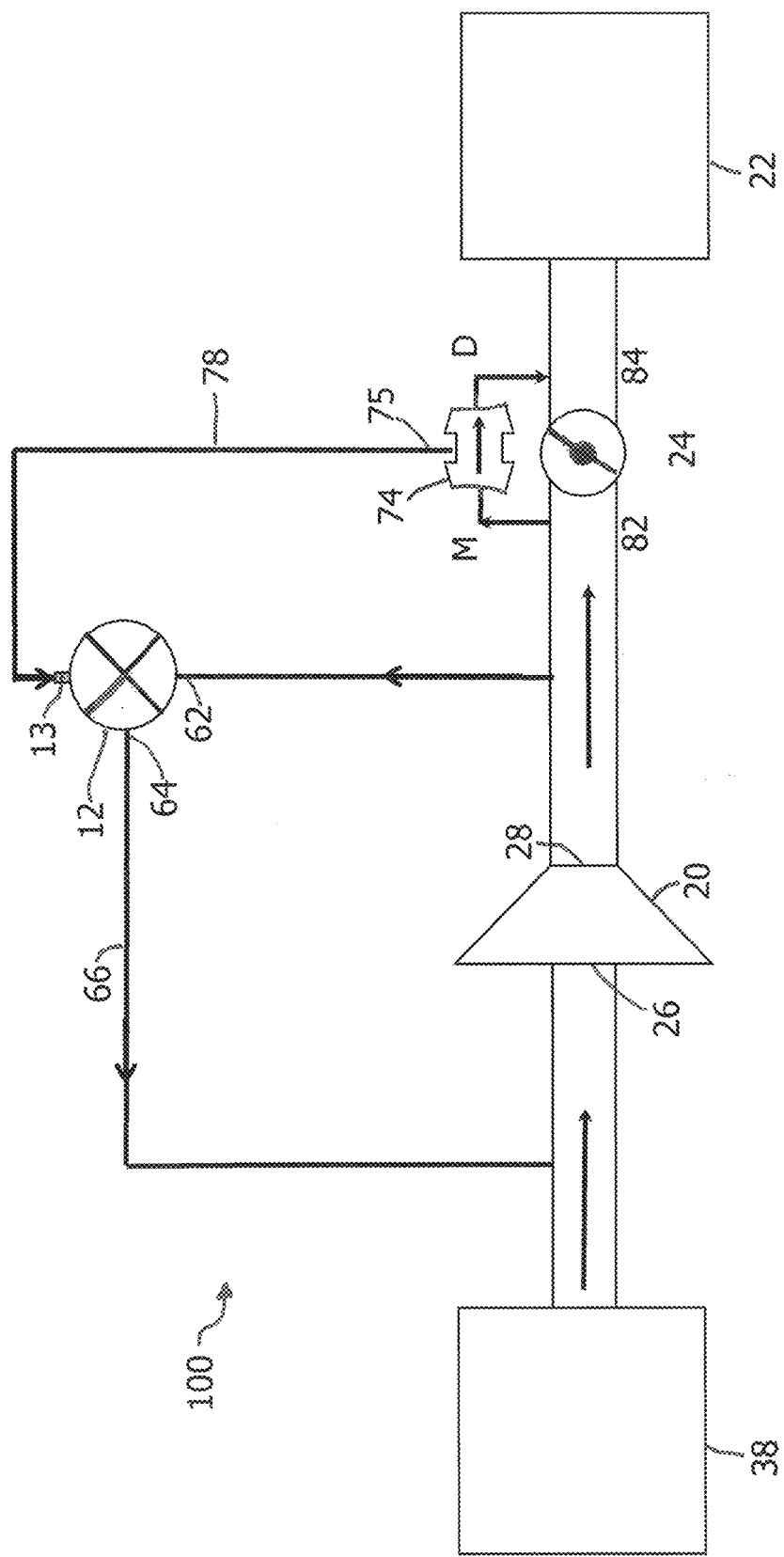
FIG. 4 is a schematic illustration of another embodiment of a system configuration that includes a pressure boost sensing CRV.

Now referring to the embodiment disclosed in FIG. 4, an engine system, generally designated by reference number 100, is illustrated as having only the second aspirator 74 in the position described above in FIG. 1 and a CRV 12 having a control chamber in fluid communication with the suction port 75 thereof. Accordingly, the aspirator in FIG. 4 is also identified by the reference number 74, but will be referred to as a throttle aspirator 74 since there is no first aspirator present in this system. The throttle aspirator 74 has its motive port (M) in fluid communication with the inlet 82 of the throttle 24 and its discharge port (D) in fluid communication with the outlet 84 of the throttle 24, which leads to the manifold 22. The fluid communication between the throttle aspirator 74 and the CRV 12 is by conduit 78. The CRV 12 is connected into the engine system 100 as described above for FIG. 1. Accordingly, the CRV is also identified by the reference number 12 and has an inlet port 62 and an outlet port 64 and arrows indicating the direction of flow when the valve portion thereof is in an open position to facilitate fluid flow through the bypass 66.

Still referring to FIG. 4, in operation, specifically when the engine is running, air flows through the throttle 24, i.e., the throttle 24 is open, creating a pressure drop dependent on the flow rate across the throttle. Here, during the steady state with boost the throttle is open and little suction vacuum is created, which enables the CRV 12 to have the valve portion thereof in a closed position. However, when the throttle 24 is closed, the throttle 24 closes the primary fluid communication passage between the second end 28 of the compressor 20 and the manifold 22, which causes an increased flow through the throttle aspirator 74 to generate greater suction vacuum (the suction pressure is a low numerical value relative to 0 kPa and the pressure difference between the inlet 82 and the outlet 84 of the throttle is high). The vacuum generated evacuates the pressure from the control chamber of the CRV 12 thereby moving the actuator therein to move the valve portion into an open position, which in turn short circuits the compressor flow from its second end 28 (outlet) back to its first end 26 (inlet) (opens bypass 66 through the CRV 12).

In operation, when the throttle opening increases to a certain point, i.e., a partially open position between 0 and 90 degrees, the pressure difference between the inlet 82 and the outlet 84 thereof decreases to a value that causes the suction pressure to increase to a higher numerical value relative to 0 kPa, i.e., there is less draw of air through the suction port 75 of the aspirator 74 than when the throttle is closed. When the suction pressure's numerical value reaches a certain threshold value, the CRV 12 closes under the force of the spring therein and the compressor is no longer bypassed.

The above described engine systems automatically minimizes surge during boost. Here, no external control system is required to monitor and activate the CRV and/or the gate valve. Instead the CRV and/or the gate valve operate purely on the changes in pressure within the system, thereby forming a loop that resets itself.

Having described the invention in detail and by reference to preferred embodiments thereof, it will be apparent that modifications and variations are possible without departing from the scope of the invention which is defined in the appended claims.

What is claimed is:

1. An engine system comprising:
 a compressor coupled to an engine and supplying air to an intake manifold;
 a throttle controlling the supply of air from the compressor to the intake manifold;
 a compressor recirculation valve having a pneumatic control chamber;
 a throttle aspirator having its motive section in fluid communication with an inlet of the throttle and its discharge section in fluid communication with an outlet of the throttle, and
 a suction port of the throttle aspirator in fluid communication with the pneumatic control chamber of the compressor recirculation valve.

2. The engine system of claim 1, wherein the compressor is a portion of a turbocharger coupled to the engine.

3. The engine system of claim 1, wherein the engine is a natural gas engine.

4. The engine system of claim 1, wherein during a steady state with boost, air flows through the throttle creating a pressure drop and little suction vacuum is created which enables the CRV to have a valve portion thereof in a closed position.

5. The engine system of claim 4, wherein, when the throttle is closed, increased flow occurs through the throttle aspirator thereby generating greater suction vacuum than during the steady state with no boost which evacuates the pneumatic control chamber of the compressor recirculation valve thereby opening the compressor recirculation valve to allow compressed air to flow through a bypass.

6. The engine system of claim 5, wherein, when the throttle opens to a predetermined partially open position and the flow through the throttle aspirator decreases to a threshold value, the compressor recirculation valve closes under the force of a spring therein.

7. A method for automatically minimizing surge during boost in an engine system, the method comprising:
 providing the engine system of claim 1;
 operating the engine under a boost condition with the throttle open, wherein air flows through the throttle creating a pressure drop and little suction vacuum is created, which enables the CRV to have a valve portion thereof in a closed position under the force of a spring therein; and
 closing the throttle under the boost condition, wherein the throttle aspirator evacuates the pneumatic control chamber of the compressor recirculation valve, which opens the compressor recirculation valve to allow the compressed air to flow through the compressor recirculation valve.

8. The method of claim 7, further comprising opening the throttle to a predetermined partially open position thereby decreasing the flow of air through the throttle aspirator until a threshold value is met or exceeded, which closes the compressor recirculation valve under the force of the spring therein.

9. An engine system comprising:
a compressor coupled to an engine and supplying air to an intake manifold;
a throttle controlling the supply of air from the compressor to the intake manifold;
a vacuum reservoir;
a first aspirator having its motive section in fluid communication downstream of the compressor and its discharge section in fluid communication upstream of the compressor;
a suction port of the first aspirator in fluid communication with the vacuum reservoir;
a compressor recirculation valve having a pneumatic control chamber in fluid communication with downstream air from the compressor and in fluid communication with the vacuum reservoir;
a gate valve controlling the fluid communication of the pneumatic control chamber of the compressor recirculation valve with the downstream air and the vacuum reservoir, the gate valve having a pneumatic control chamber;
a second aspirator having its motive section in fluid communication with an inlet of the throttle and its discharge section in fluid communication with an outlet of the throttle; and
a suction port of the second aspirator in fluid communication with the pneumatic control chamber of the gate valve.

10. The engine system of claim 9, wherein the vacuum reservoir includes a vacuum limiting valve.

11. The engine system of claim 9, further comprising a check valve between the suction port of the first aspirator and the vacuum reservoir.

12. The engine system of claim 9, further comprising a fluid line connecting the pneumatic control chamber of the gate valve to an air induction system.

13. The engine system of claim 9, wherein the engine is a natural gas engine.

14. The engine system of claim 9, wherein, under boost with the throttle open, the first aspirator evacuates the vacuum reservoir, the flow through the second aspirator is at a minimum thereby allowing compressed air from the compressor to flow through the suction port of the second aspirator into the pneumatic control chamber of the gate valve which moves or maintains the gate valve in a first open position placing the pneumatic control chamber of the compressor recirculation valve in fluid communication with compressed air from the compressor thereby closing the compressor recirculation valve or maintaining a closed position of the compressor recirculation valve.

15. The engine system of claim 9, further comprising a fluid line in fluid communication with an air induction system and the pneumatic control chamber of the gate valve.

16. The engine system of claim 15, wherein, when the throttle closes under boost, the second aspirator evacuates the pneumatic control chamber of the gate valve, which switches the gate valve from a first open position to a second open position placing the pneumatic control chamber of the compressor recirculation valve in fluid communication with the vacuum reservoir thereby opening the compressor recirculation valve in response to a vacuum reservoir pressure.

* * * * *